(12) United States Patent
Chang et al.

(10) Patent No.: US 8,937,767 B2
(45) Date of Patent: Jan. 20, 2015

(54) AUTO-STEREOSCOPIC DISPLAY AND THREE-DIMENSIONAL IMAGING DOUBLE-SIDED MIRROR ARRAY

(75) Inventors: Yia-Chung Chang, Taipei (TW); Li-Chuan Tang, Taipei (TW)

(73) Assignee: Academia Sinica, Taipei (TW)

( * ) Notice: Subject to any disclaimer, the term of this patent is extended or adjusted under 35 U.S.C. 154(b) by 358 days.

(21) Appl. No.: 13/468,602

(22) Filed: May 10, 2012

(65) Prior Publication Data

US 2012/0287505 A1 Nov. 15, 2012

Related U.S. Application Data

(60) Provisional application No. 61/485,001, filed on May 11, 2011.

(51) Int. Cl.
*G02B 27/22* (2006.01)
*G02B 27/24* (2006.01)
*H04N 13/04* (2006.01)

(52) U.S. Cl.
CPC ........ *G02B 27/2214* (2013.01); *H04N 13/0402* (2013.01)

USPC ............................ 359/466; 359/471; 359/477

(58) Field of Classification Search
USPC .................................................. 359/466, 477
See application file for complete search history.

(56) References Cited

U.S. PATENT DOCUMENTS

| 6,266,106 B1 | 7/2001 | Murata et al. |
| 6,795,250 B2 | 9/2004 | Johnson et al. |

*Primary Examiner* — Jade R Chwasz
(74) *Attorney, Agent, or Firm* — Ditthavong & Steiner, P.C.

(57) ABSTRACT

An auto-stereoscopic display and three-dimensional imaging double-sided mirror array being low-loss and nearly dispersion-less. The double-sided mirror array for auto-stereoscopic display and three-dimensional (3D) imaging comprises a display panel, a slab and an array. The display panel comprises multiple display pixels. The slab is in close contact with the display panel. The array comprises at least two vertical mirror strips, at least one vertical blinds and a spacing. Each vertical mirror strip is inserted into the slab. Each vertical blind is shorter than the vertical mirror strip and is inserted into the slab between two vertical mirror strips. The spacing is between the vertical mirror strip and the vertical blind and is chosen to match the width of the display pixels exactly.

5 Claims, 5 Drawing Sheets

AUTO-STEREOSCOPIC DISPLAY AND THREE-DIMENSIONAL IMAGING DOUBLE-SIDED MIRROR ARRAY

REFERENCE TO PRIORITY APPLICATION

This application claims priority to U.S. Provisional Application Ser. No. 61/485,001, filed on May 11, 2011, the disclosure of which is hereby incorporated herein by reference.

FIELD OF THE INVENTION

The invention relates to an auto-stereoscopic display and three-dimensional imaging double-sided mirror array.

BACKGROUND OF THE INVENTION

High definition 3D televisions based on stereoscopic display have become a recent trend. An ideal stereoscopic display can make the viewer appreciate the real image. The current techniques of showing three-dimensional images can be divided into two categories. One requires wearing a viewing aid in the form of goggles that filter left or right images either by time-shuttering, color filtering or polarization filtering. The other is designed for the naked eyes. Both have their advantages and disadvantages.

U.S. Pat. No. 6,266,106 discloses liquid crystal for a right eye and liquid crystal for a left eye, which are not positioned in one plane, but are positioned at a 5° incline. Specifically, both liquid crystals are inclined so that they are closer to the viewer's face as they approach the side of the face from the middle of the forehead. The inclination of liquid crystal as described sets the preferential direction of the visual view of the liquid crystal to be horizontal leads in that the direction by which the high contrast of liquid crystal can be obtained is toward the 3D display. It diminishes a phenomenon like cross-talk and allows the viewer to view the appropriate stereoscopic image. Liquid crystal for the right eye and liquid crystal for the left eye have the same construction. The liquid crystals make contrast with each other and then they are mounted on a liquid crystal shutter glasses portion. This makes positioning each electrode in the center of the liquid crystal shutter glasses portion possible. The electric circuit in the center of the liquid crystal shutter glasses portion makes it easy to make electric contact between the circuit and the electrode.

Wearing a viewing aid can give a better three-dimensional effect and more vivid color, but prolonged use will increase the stress on the viewer's eyes and may lead to discomfort.

U.S. Pat. No. 6,795,250 discloses a lenticular lens array for creating a visual effect for an image viewed through the lenticular lens array comprises a multiple lenticules adjacent to each other. Each lenticule comprises a lenticular lens element on one side and a substantially flat surface on an opposite side. Each lenticular lens element has a vertex and a cross section comprising a portion of an elliptical shape. Alternatively, the cross section can comprise an approximated portion of an elliptical shape. The elliptical shape comprises a major axis substantially perpendicular to the substantially flat surface of each respective lenticular lens element. The vertex of each respective lenticular lens element lies substantially along the major axis of the elliptical shape.

The naked-eye 3D or auto-stereoscopic display will cause less discomfort, but the quality of stereoscopic image is poor and the viewing angle is limited.

Accordingly, a new multiple-view auto-stereoscopic display scheme is needed to produce a high-quality 3D image.

SUMMARY OF THE INVENTION

One object of the invention is to provide an auto-stereoscopic display and three-dimensional imaging double-sided mirror array with low-loss and nearly dispersion-less. The auto-stereoscopic display and three-dimensional (3D) imaging double-sided mirror array comprises a display panel, a slab and an array.

The display panel comprises multiple display pixels. The slab is in close contact with the display panel. The array comprises at least two vertical mirror strips, at least one vertical blind and a spacing. Each vertical mirror strip is inserted into the slab. Each vertical blind is shorter than the vertical mirror strip and is inserted into the slab between two vertical mirror strips. The spacing is between the vertical mirror strip and the vertical blind and is chosen to match the width of the display pixels exactly.

DETAILED DESCRIPTION OF THE PRESENT INVENTION

Figure 1:
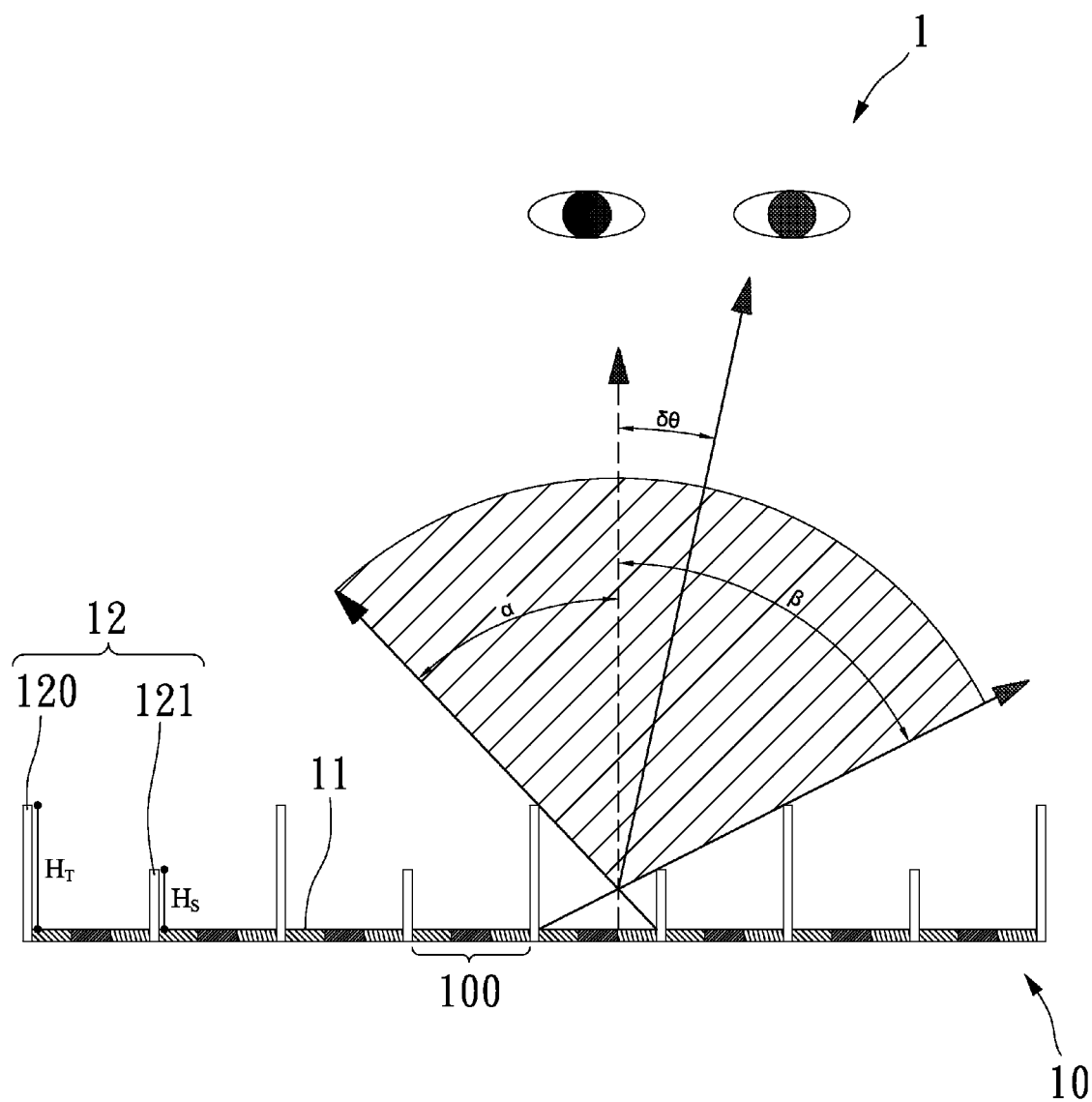
FIG. 1 is a perspective view of redirection of light from the left pixel within the slab.
Figure 2:
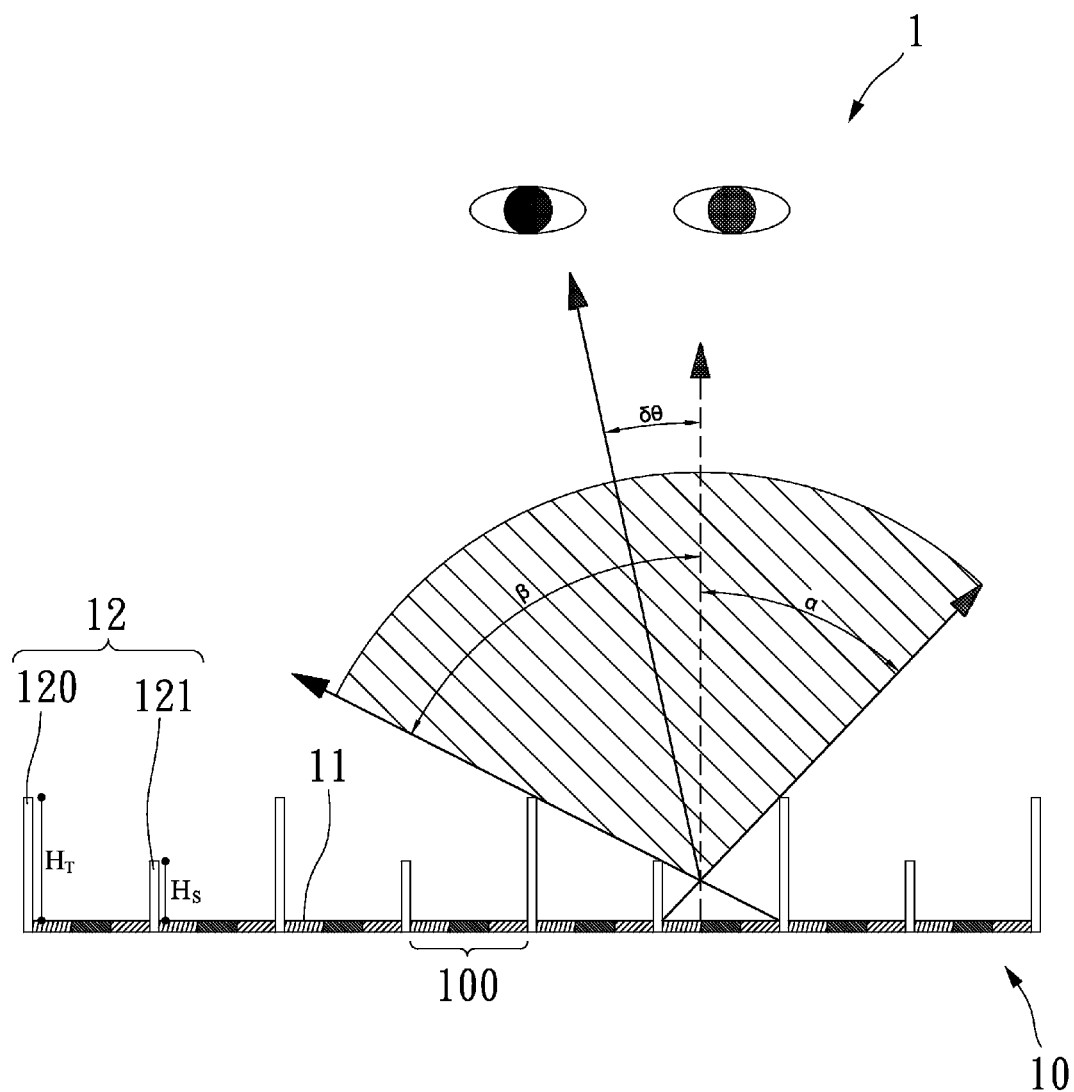
FIG. 2 is a perspective view of redirection of light from the right pixel within the slab.

With reference to FIGS. 1 and 2, an auto-stereoscopic display and three-dimensional imaging double-sided mirror array (1) is low-loss, nearly dispersion-less and comprises a display panel (10), a slab (11) and an array (12).

The display panel (10) comprises multiple display pixels (100). Each display pixel (100) comprises an optional width. The width of the display pixel (100) is denoted by W.

The slab (11) is in close contact with the display panel (10). The array (12) comprises at least two vertical mirror strips (120), at least one vertical blind (121) and a spacing. Each vertical mirror strip (120) is inserted into the slab (11) and has an optional adjustable height. The adjustable height of the vertical mirror strip (120) is denoted by $H_T$.

Each vertical blind (121) is shorter than the vertical mirror strip (120), is inserted into the slab (11) between two vertical mirror strips (120) and has an optional adjustable height. The adjustable height of the vertical blind (121) is denoted by $H_S$.

The spacing is between the vertical mirror strip (120) and the vertical blind (121) and is chosen to match the width of the display pixels (100) exactly.

By choosing proper values of $H_T$, $H_S$, and half period W that match the width of the display pixel (100), the emitted light of the left (right) pixel in each period of the array (12) can be redirected in a direction slightly away from the normal direction of the display plane (10) toward the right (left) eye, thus achieving a desired auto-stereoscopic effect.

$H_S = W/\tan(\theta_c)$, where $\theta_c = \sin^{-1}(1/n_g)$ is the critical incident angle for the slab (11) with refractive index $n_g$, which would lead to the largest viewing angle, while avoiding leakage of undesired light.

The average angle of light emitting can derive from each display pixel (100), which typically consists of three light sources in red, green and blue (RGB) as in a liquid crystal display (LCD). For other true color displays, each display pixel (100) can be a uniform light source with a given color. For each RGB pixel in an LCD to be treated as a display pixel (100) with uniform color, the rectangular RGB segments should be oriented horizontally instead of vertically as in the LCD. Assuming that each display pixel (100) has a uniform color, the angle between the central axis of the emitted light from a display pixel (100) and the normal direction defined as:

$$\delta\theta(W, H_T, H_S) = (f(\beta) - f(\alpha))/2 = [f(\tan^{-1}(W/H_S)) - f(\tan^{-1}(W/H_T))]/2 \quad \text{Eq. 1}$$

Here $\alpha = \tan^{-1}(W/H_T)$ denotes the angle of the marginal ray near the vertical mirror strip (120) side (before exiting the slab (11)), and $\beta = \tan^{-1}(w/H_S)$ denotes the angle of the marginal ray near the vertical blind (121) side (before exiting the slab (11)). We always have $\alpha < \beta$ since $H_T > H_S$. Any light ray propagating at angle $\theta$ in the slab (11) (with respect to the normal axis) will exit with angle $f(\theta)$, where $f(\theta) = \sin^{-1}(n_g \sin \theta)$ is a conversion function which converts an incident angle in the slab (11) to the refracted angle in the air according to the Snell's Law. Since all light rays are emitted from a light source under and separated from the slab (11) by a thin layer of air, these light rays cannot propagate inside the slab (11) with an angle larger than $\theta_c$, the critical angle. Thus, there is no need to worry about the multiple reflections. All light rays will either exit the slab (11) directly or via a single reflection from the slab (11). The optimum condition is obtain when Eq. 2: $H_S = W/\tan(\theta_c)$ such that one marginal ray will exit the slab (11) with angle $f(\beta) = 90°$. The double-sided mirror array for auto-stereoscopic display and three-dimensional (3D) imaging (1) has a maximum viewing angle. The maximum viewing angle Eq. 3: $(\theta_M) = f(\alpha) = f(\tan-1(W/H_T))$, which can be varied by adjusting the design parameters W and $H_T$. For a given desired value of $\theta_M$, we can invert Eq. 3 and obtain Eq. 4: $H_T = W/\tan[\sin^{-1}(\sin(\theta_M)/n_g)]$, which provides a simple design recipe for determining $H_T$.

Figure 3:
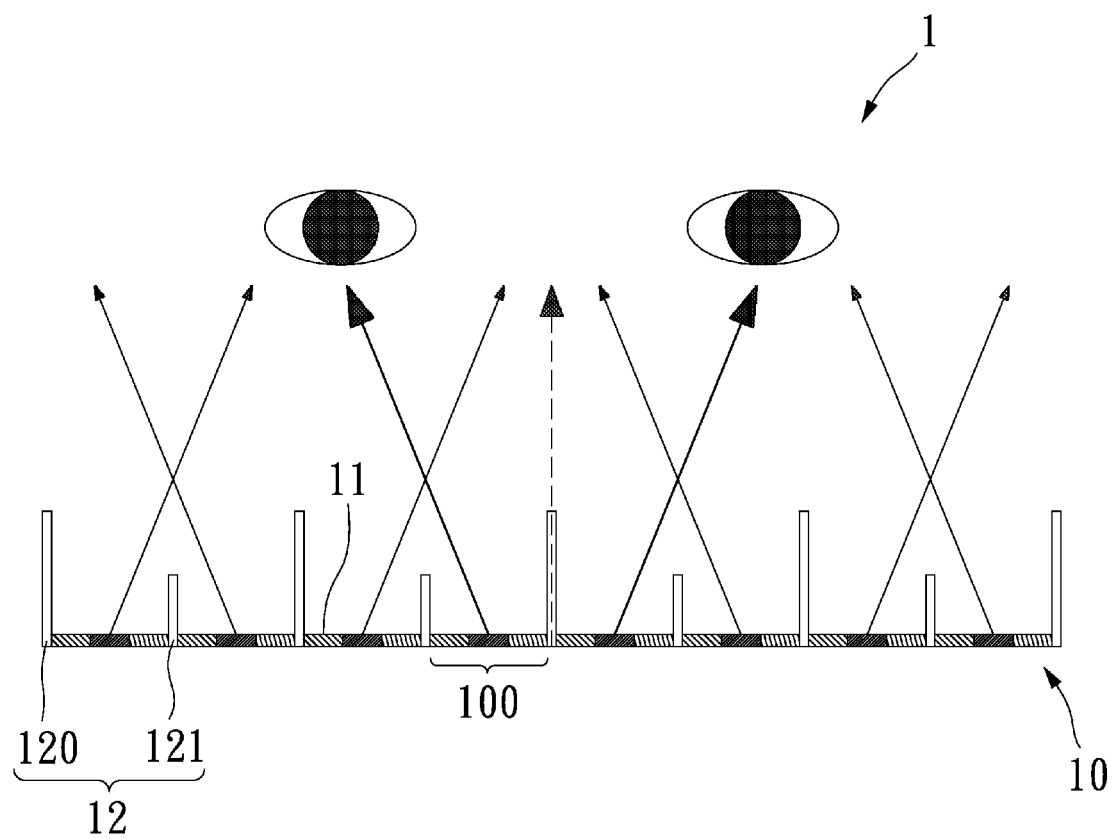
FIG. 3 is a perspective view of an array of alternating left and right pixels.
Figure 4:
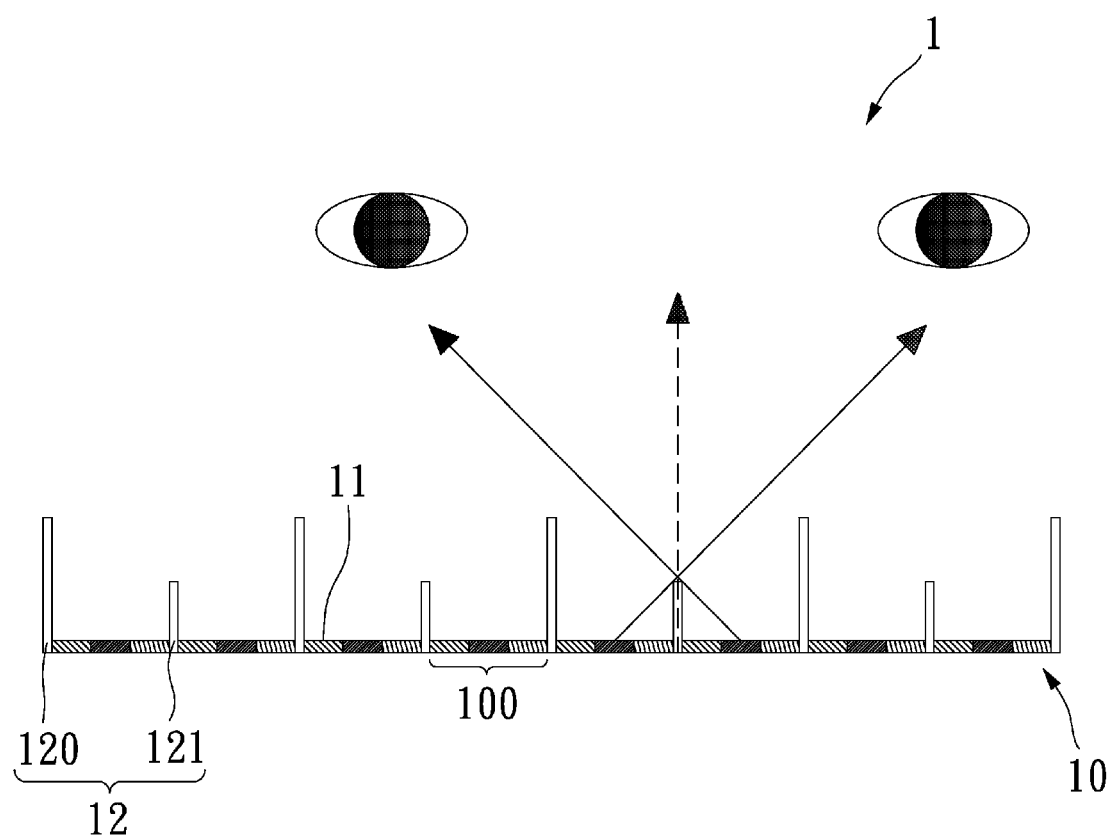
FIG. 4 is a perspective view of a display of the present invention.

With further reference to FIGS. 3 and 4, choose the optimum condition $f(\alpha) = 90°$ by letting $H_S = W/\tan(\theta_c)[H_S = W/0.9$ when $\theta_c = 42°$ (or $n_g = 1.5$)], the axial angle, and the maximum viewing angle can be related by the simple formula, $\theta_M = 90° - 2\delta\theta$. The typical $\delta\theta$ needed to reduce the influence of focus cues on perceptual distortions, fusion failures and fatigue of a stereoscopic image ranges from 2° and 15° (since $\tan(\delta\theta) = s/d$, where s denotes the separation between two eyes and d is the distance for clear vision), which can be achieved by setting $H_T$ between 1.149 W and 1.414 W with a maximum viewing angle between 80° and 60°. For a close-view DMA display, a design with $\delta\theta$ varying form pixel to pixel may be more desirable, which can also be achieved by allowing $H_T$ to vary from pixel to pixel.

Figure 5:
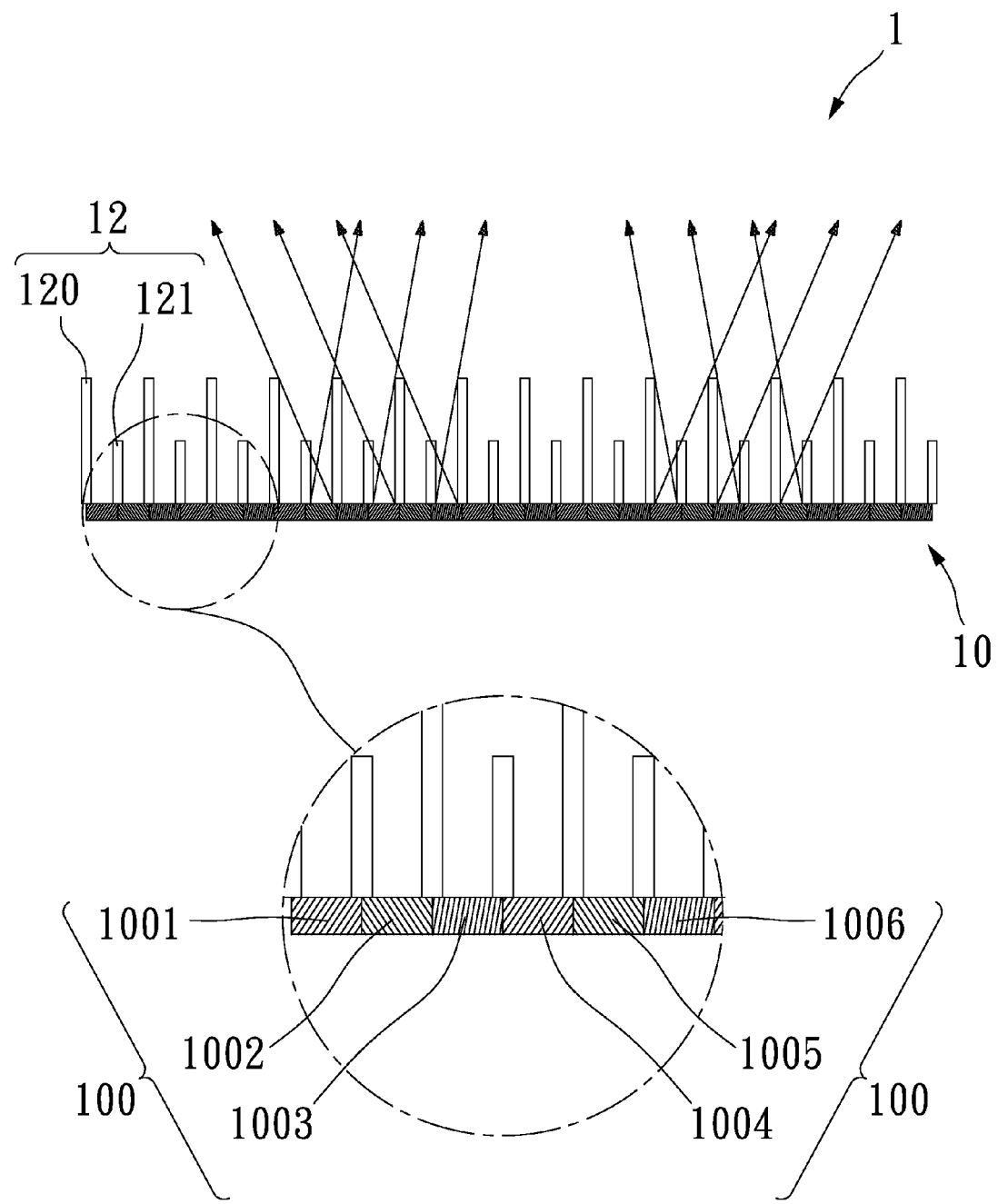
FIG. 5 is a perspective view of the redirection of light from the RGB subpixels.

With further reference to FIG. 5, the auto-stereoscopic display and three-dimensional imaging double-sided mirror array (1) can redirect the emitted light from alternating display pixels (100) to alternating directions. However, in the array (12) display all light rays hitting the vertical mirror strips (120) will exit the slab (11) with single reflection, thus having negligible power loss. The main power loss is due to light rays hitting the vertical blind (121), which is not significant since only a small fraction of light can hit vertical blinds (121) with an angle less than $\theta_c$. In comparison, for designs based on traditional barrier arrays, about 50% of the light will be blocked. For lenticular len arrays, some light rays would suffer from internal reflections at the curved surface and eventually be absorbed by the elements below, so it will also suffer some power loss.

Furthermore, the auto-stereoscopic display and three-dimensional imaging double-sided mirror array (1) does not suffer from the problem of leakage of light from neighboring pixels as present in the lenticular lens array display, thus leading to higher quality auto-stereoscopic image.

For existing LCDs with vertically aligned RGB segments, the use of the auto-stereoscopic display and three-dimensional imaging double-sided mirror array (1) may lead to chromatic dispersion, since the axial angles for the three RGB subpixels in each pixel (100) can be different. For the red, green, and blue subpixels (1001, 1002, 1003, 1004, 1005 and 1006), the axial angles are calculated to be $$\delta\theta_R = [f(\tan^{-1}(W/H_S)) - [f(\tan^{-1}(W/3H_T))]/2$$

$$\delta\theta_G = [f(\tan^{-1}(2W/3H_S)) - [f(\tan^{-1}(2W/3H_T))]/2$$

$$\delta\theta_B = [f(\tan^{-1}(W/3H_S)) - [f(\tan^{-1}(W/H_T))]/2$$

This chromatic dispersion can lead to undesired effect. However, such a problem can be overcome by using the auto-stereoscopic display and three-dimensional imaging double-sided mirror array (1) with a half period that matches the width of a subpixel ($W_S = W/3$), the six subpixels in a double display pixel (100) unit are labeled 1001, 1002, 1003, 1004, 1005 and 1006. The light emitted from odd-numbered subpixels (1001, 1003 and 1005) with color red, blue, and green are redirected to the right, while the even-numbered green, red, and blue subpixels (1002, 1004 and 1006) are redirected to the left, thus achieving the auto-stereoscopic effect. The design recipes given above can still be used by simply substituting W with $W_S$ in Eqs. (2) and (4). The axial angles for light emitting from all subpixels given by $\delta\theta = [f(\tan^{-1}(W_S/H_S)) - f(\tan^{-1}(W_S/H_T))]/2$ are all approximately the same, if the refractive index of the slab (11), $n_g$ has a weak wavelength dependence. For a typical glass material made of $SiO_2$, $n_g$ varies from 1.51 in red to 1.53 in blue, so the effect can be ignored. In contrast, in a conventional lenticular lens array, the chromatic dispersion can be a serious problem, since it is difficult to make $\delta\theta$ the same for subpixels (1001, 1002, 1003, 1004, 1005 and 1006) lying at different locations below a lenticular lens. Furthermore, the stray light rays emitting from neighboring pixels in lenticular lens array can lead to image distortion and more chromatic dispersion.

With the maturity of current microfabrication technology, the fabrication of the designs of the auto-stereoscopic display and three-dimensional imaging double-sided mirror arrays (1) described above should be feasible. We propose two possible methods to fabricate the auto-stereoscopic display and three-dimensional imaging double-sided mirror arrays (1). In the first method, the slab (11) can be passed through a carving machine to produce lines of grooves with alternating depths, which match the desired values of $H_T$ and $H_S$. In the second method, a mold with a rigid material mimicking the auto-stereoscopic display and three-dimensional imaging double-sided mirror array (1) attached to a substrate can be fabricated by optical lithography according to the design specification. The mold can be used to print out a negative pattern (with grooves) on a plastic material via an imprint machine. The slab (11) may be a glass plate (fabricated by Method 1) or a plastic plate (fabricated by Method 2). Finally, the deeper grooves (with depth $H_T$) in the glass plate (fabricated by Method 1) or plastic plate (fabricated by Method 2) will be filled with a reflecting material such as silver (Ag), nickel (Ni), aluminum (Al) or other metals either by pouring the filling material in liquid form or by using an evaporation process to form the pixel-matched auto-stereoscopic display and 3D imaging double-sided mirror array (1). The shallower grooves (with depth $H_S$) will be filled with an absorbing material or diffusive material to form the vertical blinds (121).

The auto-stereoscopic display and three-dimensional imaging double-sided mirror array (1) with its half period either matched to the display pixels (100) (for a true color display or horizontally aligned RGB display) or subpixels (1001, 1002, 1003, 1004, 1005 and 1006) (for vertically aligned RGB display) can give rise to the desired auto-stereoscopic effect with low power loss (for high brightness), low chromatic dispersion (for better color fidelity), and minimal stray light (for better clarity). Therefore, the present invention represents a promising solution to the naked-eye 3D display technology. The present invention can be used for various applications related to auto-stereoscopic display and 3D imaging. The present invention can be directly placed over a LCD panel (prior to the encapsulation with a glass panel) or other pixel-based display panel to convert the existing technology for 2D display into a new technology for 3D display. The present invention can also be used as a picture frame to display a vivid 3D image when a properly manufactured picture or photo is inserted behind the DMA panel. The picture quality will be superior to those made with the existing lenticular lens array technology for the reason mentioned above.

The present invention can overcome the problems such as dispersive interference and cross-talk often encountered in traditional auto-stereoscopic display schemes, e.g. the lenticular lens array (LLA). Furthermore, the power loss of present invention will be significantly lower compared with designs based on traditional barriers array.

While the invention has been described in connection with what is considered the most practical and preferred embodiment, that this invention is not limited to the disclosed embodiment but is intended to cover various arrangements included within the spirit and scope of the broadest interpretation so as to encompass all such modifications and equivalent arrangements is understood.

What is claimed is:

1. An auto-stereoscopic display and three-dimensional (3D) imaging double-sided mirror array comprising:
    a display panel comprising multiple display pixels;
    a slab being in close contact with the display panel; and
    an array comprising:
        at least two vertical mirror strips being inserted into the slab;
        at least one vertical blind being shorter than the vertical mirror strips and being inserted into the slab between two vertical mirror strips; and
        a spacing between the vertical mirror strip and the vertical blind and is chosen to match the width of the display pixels exactly.

2. The auto-stereoscopic display and three-dimensional imaging double-sided mirror array as claimed in claim 1, wherein each vertical mirror strip has an adjustable height.

3. The auto-stereoscopic display and three-dimensional imaging double-sided mirror array as claimed in claim 2, wherein each display pixel comprises a width denoted by W, the adjustable height of the vertical mirror strip is denoted by $H_T$, the adjustable height of the vertical blind is denoted by $H_S$, $H_S=W/\tan(\theta_c)$, where $\theta_c=\sin^{-1}(1/n_g)$ is the critical incident angle for the slab (11) with refractive index $n_g$.

4. The auto-stereoscopic display and three-dimensional imaging double-sided mirror array as claimed in claim 3, wherein each pixel has a red subpixel having a axial angle ($\delta\theta_R$), a green subpixel having a axial angle ($\delta\theta_G$), and a blue subpixel having a axial angle ($\delta\theta_B$), and $\delta\theta_R=[f(\tan^{-1}(W/H_S))-[f(\tan^{-1}(W/3H_T))]/2$, $\delta\theta_G=[f(\tan^{-1}(2W/3H_S))-[f(\tan^{-1}(2W/3H_T))]/2$ and $\delta\theta_B=[f(\tan^{-1}(W/3H_S))-[f(\tan^{-1}(W/H_T))]/2$.

5. The auto-stereoscopic display and three-dimensional imaging double-sided mirror array as claimed in claim 4 has a maximum viewing angle of $(\theta_M)=f(\alpha)=f(\tan-1(W/H_T))$, which can be varied by adjusting the design parameters W and $H_T$.

* * * * *